(12) United States Patent
Tappeiner

(10) Patent No.: US 9,411,323 B2
(45) Date of Patent: Aug. 9, 2016

(54) HOME ENERGY MANAGEMENT SYSTEM

(71) Applicant: Tekpea, Inc., Palo Alto, CA (US)

(72) Inventor: Davide Tappeiner, Genoa (IT)

(73) Assignee: Tekpea, Inc., Palo Alto, CA (US)

( * ) Notice: Subject to any disclaimer, the term of this patent is extended or adjusted under 35 U.S.C. 154(b) by 306 days.

(21) Appl. No.: 13/864,638

(22) Filed: Apr. 17, 2013

(65) Prior Publication Data

US 2013/0282196 A1    Oct. 24, 2013

Related U.S. Application Data

(60) Provisional application No. 61/635,204, filed on Apr. 18, 2012.

(51) Int. Cl.
*G05B 13/02* (2006.01)
*G05B 15/02* (2006.01)
*H04L 12/28* (2006.01)

(52) U.S. Cl.
CPC .............. *G05B 13/02* (2013.01); *G05B 15/02* (2013.01); *H04L 12/2836* (2013.01); *G05B 2219/25168* (2013.01)

(58) Field of Classification Search
CPC ............... G05B 13/02; G05B 2219/25168; G05B 15/02
See application file for complete search history.

(56) References Cited

U.S. PATENT DOCUMENTS

| | | | |
|---|---|---|---|
| 5,862,391 A * | 1/1999 | Salas et al. | 713/300 |
| 5,949,779 A * | 9/1999 | Mostafa et al. | 370/389 |
| 6,778,099 B1 * | 8/2004 | Meyer et al. | 340/870.02 |
| 6,961,641 B1 * | 11/2005 | Forth et al. | 700/295 |
| 7,246,014 B2 * | 7/2007 | Forth et al. | 702/60 |
| 8,332,055 B2 * | 12/2012 | Veillette | 700/20 |
| 2005/0138432 A1 * | 6/2005 | Ransom et al. | 713/201 |
| 2007/0013547 A1 * | 1/2007 | Boaz | 340/870.02 |
| 2007/0222579 A1 * | 9/2007 | Berkman | 340/538 |
| 2009/0210178 A1 * | 8/2009 | Bieganski | 702/62 |
| 2010/0089909 A1 | 4/2010 | Besore et al. | |

(Continued)

FOREIGN PATENT DOCUMENTS

WO    WO 2013158886 A1 * 10/2013

OTHER PUBLICATIONS

Choi, Tae-Seop et al., "Analysis of Energy Savings using Smart Metering System and IHD (In-Home Display)", Transmission & Distribution Conference & Exposition: Asia and Pacific, 2009, IEEE, Oct. 26, 2009, pp. 1-4, Piscataway, NJ, US.

(Continued)

*Primary Examiner* — Ramesh Patel
(74) *Attorney, Agent, or Firm* — Maschoff Brennan

(57) ABSTRACT

A home energy management system includes a protocol conversion device configured to provide bi-directional communication between a networking device and one or more energy meters, wherein the protocol conversion device connects to the networking device via a transmission control protocol/Internet protocol (TCP/IP) and connects to one or more energy meters via one or more communication protocols supported by one or more energy meters. The home energy management system further includes the networking device, connected to the protocol conversion device via the TCP/IP connection, configured to receive, from the protocol conversion device, data packets generated by the one or more energy meters, and transmit the data packets to a remote server.

21 Claims, 7 Drawing Sheets

(56) References Cited

U.S. PATENT DOCUMENTS

| | | |
|---|---|---|
| 2011/0010016 A1* | 1/2011 | Giroti .......................... 700/291 |
| 2011/0047370 A1 | 2/2011 | Nagel et al. |
| 2011/0202189 A1 | 8/2011 | Venkatakrishnan et al. |
| 2012/0323393 A1* | 12/2012 | Imhof et al. ................. 700/297 |

OTHER PUBLICATIONS

Extended European Search Report mailed Nov. 30, 2015 for European Patent Application No. 13777474.1.

* cited by examiner

HOME ENERGY MANAGEMENT SYSTEM

RELATED APPLICATIONS

This patent application claims the benefit under 35 U.S.C. §119(e) of U.S. Provisional Application No. 61/635,204, filed Apr. 18, 2012.

TECHNICAL FIELD

Embodiments of the invention relate generally to energy management systems, and more specifically to a home energy management system.

BACKGROUND

An electric grid is the distribution platform created by interconnecting energy production facilities, transmission lines and power transformers so that utility companies have a means of delivering electricity from suppliers to consumers. The electric grid is an electric company's domain, and in recent years the emergence of smart grid technology has given electric companies real-time visibility and control over every part of that domain—from the energy production facility all the way to the electric meter in a customer's back yard. Smart grids have resulted in more efficient management of the production, distribution and price of energy.

In order to further optimize the efficiency with which energy is produced, distributed and priced, energy consumption data from beyond the electric meter (e.g., from inside a consumer's household) can be useful to electric utilities. Unfortunately, the inside of a home or business falls outside of the domain that an electric company controls.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
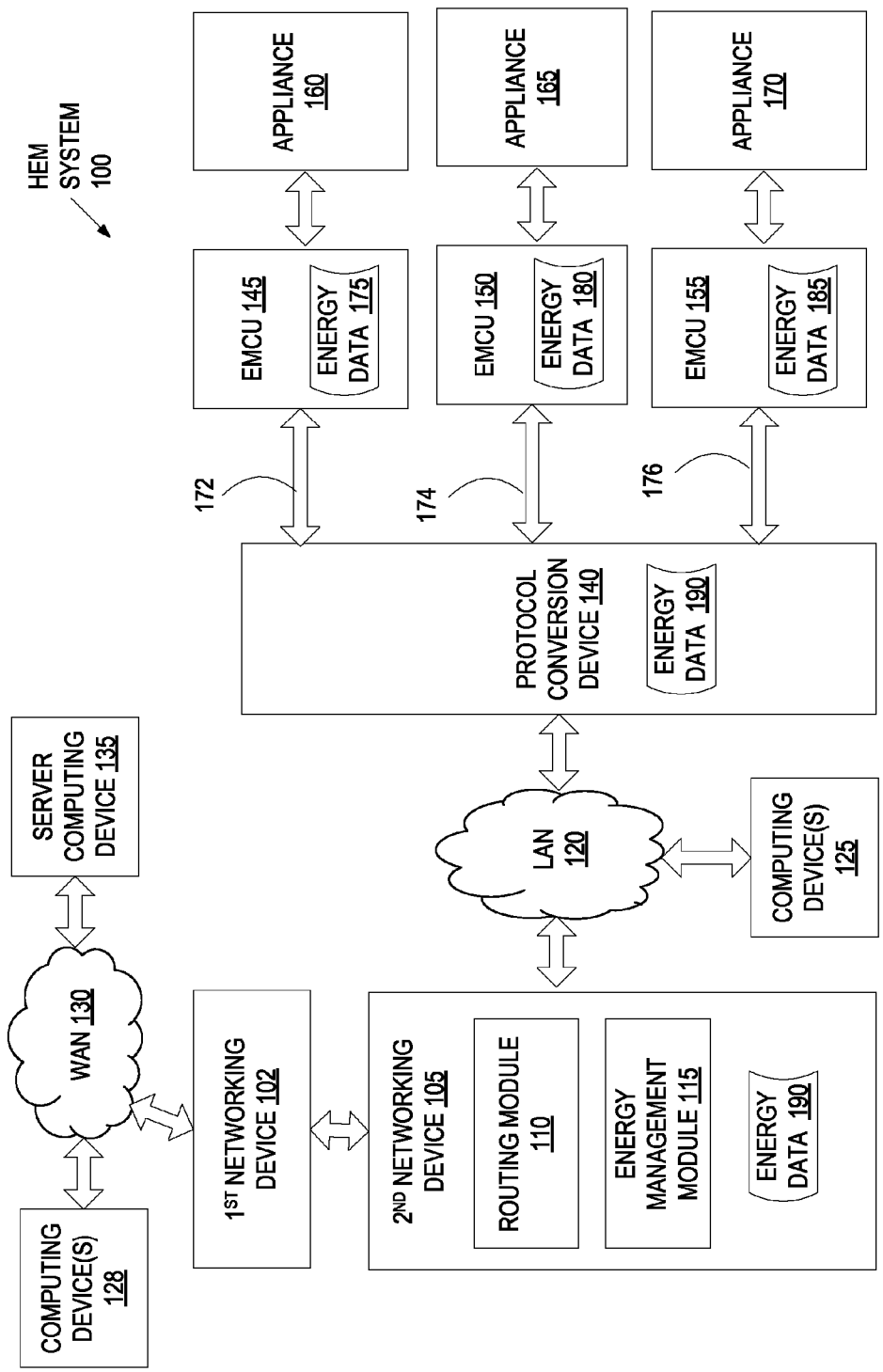
FIG. 1 is a block diagram showing one implementation of a home energy management system.

Embodiments of the invention describe a home energy management system. The home energy management system includes a networking device, one or more energy meters and a protocol conversion device that connects the networking device to the one or more energy meters. The networking device may be a commercial "off-the-shelf (OTS)" device (e.g., a cable modem provided by a cable service provider, a consumer WiFi router, a digital subscriber line (DSL) modem provided by a telephone network, etc.) with the addition of an energy management module. The protocol conversion device (also referred to as an energy management bridge) connects to the networking device via a transmission control protocol/Internet protocol (TCP/IP) connection (e.g., over an Ethernet line) and to the one or more energy meters via additional connections supported by the energy meters. The additional connections may include Zigbee™ connections, IPv6 over low power wireless personal area networks (6LoWPAN) connections, power line communication (PLC) connections, and so forth.

The energy meters may be energy monitoring and control units (EMCU) that sample energy usage of appliances connected to the energy meters, generate data packets from the sampling, and send the data packets to the protocol conversion device via one of the additional connections. The protocol conversion device may then forward the data packets to the networking device over the TCP/IP connection. The networking device may process the data packets and upload payloads of the data packets to a server. The networking device may additionally provide a user interface for controlling the energy meters and monitoring a current state and historical energy usage the appliances.

The home energy management system described in embodiments herein enables users to identify and monitor the energy usage of all of the appliances in their homes. The users may use this data and the home energy management system to control when appliances are powered and unpowered, thereby reducing overall energy consumption and associated costs. The home energy management system may also essentially extend a smart grid into homes and businesses, enabling energy utilities to identify the energy consumption of different types of appliances using anonymized energy consumption data. The home energy management system may provide utilities with access to actionable energy consumption information bundled with the ability to take real time action.

Additionally, embodiments of a home energy management system described herein have a minimal energy footprint and reduced components as compared to traditional energy management solutions. In one embodiment, the home energy management system has a low overall power consumption, which enables the system to be an effective energy management system that has the potential to conserve more energy than it consumes. Additionally the home energy management system may provide a positive return on investment by lowering household energy expenditure.

Referring now to the figures, FIG. 1 is a block diagram showing one implementation of a home energy management (HEM) System 100. The HEM System 100 includes one or more networking devices (e.g., first networking device 102 and/or second networking device 105) connected to a protocol conversion device 140 over a local area network (LAN) 120 and to a server computing device 135 over a wide area network (WAN) 130 such as the Internet. The connection between, for example, the second networking device 105 and the protocol conversion device 140 may be a TCP/IP connection such as an Ethernet connection in a wired example or a WiFi connection in a wireless example.

The protocol conversion device 140 is in turn connected to multiple energy meters, which may be energy management and control units (EMCUs) 145, 150, 155, via additional connections 172, 174, 176. The additional connections 172, 174, 176 may use protocols supported by the energy meters 145-155 but potentially not supported by the second networking device 105. Examples of such connections include a Zigbee connection, a 6LowPAN connection, a generic radio frequency (RF) connection, a proprietary RF connection, a power line communication (PLC) connection, or other connection types. Different EMCUs 145-155 may support different connection types (different protocols), and some EMCUs 145-155 may support multiple different connection types.

EMCUs 145-155 are energy meters that additionally include control functionality as well as communication functionality. The EMCUs 145-155 may include one or more memories, a processing device, and a communication interface. The memory may be a non-volatile memory that stores firmware for the EMCU and/or a volatile memory. The processing device may include a programmable logic controller (PLC), a microcontroller, microprocessor or programmable logic device such as a field programmable gate array (FPGA) or a complex programmable logic device (CPLD). Each of the EMCUs 145-155 may consume approximately 1 Watt, 0.5 Watt or less power when in standby. Moreover, the power consumed by the EMCUs may be approximately 1 Watt even when under power.

Each of the EMCUs 145-155 may be connected to or integrated into one or multiple appliances 160-170. The appliances 160-170 may be any powered device that can plug into an electrical outlet. Examples of appliances 160-170 include electric ovens, electric ranges, microwave ovens, coffee makers, washing machines, dryers, dishwashers, televisions, lights, fans, set top boxes, vacuum cleaners, air conditioners, and so on.

In one embodiment, the EMCUs 145-155 plug into electrical outlets, and the appliances 160-170 plug into the EMCUs 145-155. For example, the EMCUs 145-155 may be wall outlet EMCUs having a single switchable outlet and a single measuring point. The EMCUs 145-155 may also be power strip EMCUs having multiple configurations with switchable outlets (e.g., 6 outlets in one embodiment) and multiple measuring points.

In one embodiment, the EMCUs 145-155 are integrated into the appliances 160-170. For example, the EMCUs 145-155 may be components that are provided to manufacturers of the appliances 160-170. The EMCUs 145-155 provided to the manufacturer may be preconfigured for communicating with a specific type (e.g., model) of protocol conversion device 140 using a particular communication protocol. In another embodiment, the EMCUs 145-155 are integrated into wall outlets.

The EMCUs 145-155 can both monitor and control the flow of power to attached appliances 160-170. Additionally, in some embodiments the EMCUs 145-155 can issue commands to the attached appliances 160-170. In one embodiment, an EMCU 145-155 can communicate with the appliance 160-170 that it is attached to in order to identify a make, model and device type of the appliance 160-170. The appliance 160-170 may send this information to the EMCU 145-155. The appliance 160-170 may also send data identifying the appliance's condition and/or state of repair to the EMCU 145-155. The EMCU 145-155 may then report this information to protocol conversion device 140, which may forward the information to networking device 105. Alternatively, a user may manually input a make, model and/or device type for appliances via a GUI provided by the networking device 105 or via a simple user interface on the appliance.

The EMCUs 145-155 may have communication interfaces configured to support one or more communication interfaces and protocols for two way communication with the protocol conversion device 140. In one embodiment, one or more of the EMCUs 145-155 supports a PLC protocol. In one embodiment, one or more of the EMCUs 145-155 supports the Zigbee protocol. EMCUs 145-155 may also support 6LowPAN, generic RF, Bluetooth, WiFi, or other communication standards. In one embodiment, one or more EMCUs 145-155 support a combination of protocols, such as both Zigbee and RF.

The EMCUs 145-155 collect and store energy consumption data 175, 180-185. The EMCUs 145-155 additionally periodically send data packets containing the energy consumption data 175-185 to the protocol conversion device 140.

In one embodiment, the EMCUs 145-155 can receive ON, OFF and STANDBY commands from the protocol conversion device 140. EMCUs 145-155 may also receive a power level state command that specifies a particular power level to use. The command may specify a particular voltage to provide to an appliance, or may indicate a percentage of a full operating voltage or percentage of a standby voltage to apply. For example, the power level state command may identify that 2 Watts be provided to an appliance, or that 40% of a measured maximum power be supplied. The power level state may be used, for example, for dimming of a light or to provide half power to a motor. The EMCUs 145-155 may also receive increment power or decrement power commands, which may be used to increment or decrement an amount of power provided to an appliance by a particular amount (e.g., by 0.2 Watts).

An EMCU 145-155 can then relay received commands to an appliance 160-170 connected to the EMCU 145-155 and/or control the power delivered to the appliance 160-170 responsive to the commands. Responsive to an ON command, the EMCU 145-155 may power on an appliance. Responsive to an OFF command, the EMCU 145-155 may power off an appliance. Responsive to a STANDBY command, the EMCU 145-155 may place an appliance into a standby mode. While in the standby mode, the appliance 160-170 may consume a minimal amount of power, but may be turned on relatively quickly (as opposed to an amount of time that it may take to turn the appliance on from an off condition). Responsive to a power level state command, the EMCU 145-155 may provide a specified level of power to an appliance.

Responsive to an increment power command, the EMCU may increase the power supplied to an appliance by a specified amount. For example, an increment power command may specify that a provided power is to be increased by 1 Watt. An EMCU 145-155 receiving such a command may increase a current provided power from, for example, 1 Watt to 2 Watts. If no increment value is specified, then an EMCU 145-155 may increment the power by a default incremental amount. A decrement power command may operate in the same manner as described above with regards to the increment power command, but may instead cause an EMCU 145-155 to reduce a supplied power rather than increase the supplied power.

The protocol conversion device (also referred to as an energy management bridge) 140 is a multi-protocol, multi-standard hardware adapter that provides the means to fill technology gaps involving different communication media and protocols that may not be supported by the networking devices 102, 105. The protocol conversion device 140 creates a uniform 2-way communication mechanism between the TCP/IP protocol and the protocols supported by the EMCUs 145-155. The protocol conversion device 140 may include a volatile and/or non-volatile memory, a processing device (e.g., a microcontroller, microprocessor, FPGA, CPLD, etc.), and multiple communication interfaces to support different communication protocols such as power line communication (PLC), Zigbee, RF (generic and non-generic), 6LowPAN, WiFi, or any other protocol.

The protocol conversion device 140 receives data packets containing the energy consumption data 175-185 from the EMCUs 145-155. The protocol conversion device 140 then forwards the data packets on to the second networking device 105 (or to the first networking device 102 in some implementations). The protocol conversion device 140 may also store energy consumption data 190, which may include energy consumption data 175-185 received from multiple EMCUs 145-155.

In one embodiment, the first networking device 102 is a cable modem, a DSL modem, a DSL router, a wireless telecommunication modem (e.g., a long term evolution (LTE) modem, a worldwide interoperability for microwave access (WiMAX) modem, a universal mobile telecommunications (UMTS) modem, etc.), or other internet router capable of connecting the WAN 130 to the LAN 120. The second networking device 105 may be a WiFi router, a network switch, a wireless access point, or other device capable of providing access to multiple computing devices on the LAN 120. In one embodiment, a single networking device provides the functionality of the first and second networking devices 102, 105. The networking devices 102, 105 may each consume 1 Watt, 0.5 Watt or less of power when in standby, and may consume approximately 5 Watts or less of power while in operation.

The first networking device 102 and second networking device 105 may each include a memory (e.g., Flash memory, read only memory (ROM), or other non-volatile memory) that stores firmware for the networking device. The networking devices 102, 105 may additionally include processing devices that execute instructions in the firmware. In one embodiment, the firmware of the second networking device 105 includes a routing module 110 and an energy management module 115. The routing module 110 may be standard firmware for a wireless router (e.g., a WiFi router) or other networking device that provides typical networking functionality for the second networking device 105. For example, if the second networking device 105 is a wireless router, then the routing module 110 may perform functions of a router, a network switch and a wireless access point.

The energy management module 115 may be hardware, firmware or software installed on a standard networking device 105, such as an internet router. The energy management module 115, when installed on the networking device, converts the networking device 105 into an energy management gateway. Converting a networking device into an energy management gateway without compromising any of the networking device's existing functionality may be performed using a combination of the energy management module 115 and the attached protocol conversion device 140. The networking device 105, with the energy management module 115 running on it, may serve as the brains of the HEM System 100, by storing and saving all commands, configurations and data for different components of the HEM System 100. Note that though second networking device 105 is shown as containing the energy management module 115, the energy management module 115 may alternatively be included in the first networking device 102.

The energy management module 115 receives the data packets containing the energy consumption data (also referred to as energy data) 190 collected by the multiple EMCUs 145-155 from the protocol conversion device 140. The energy management module 115 may cache the energy consumption data 190. Additionally, the energy management module 115 may upload the energy consumption data 190 to the server computing device 135.

The energy management module 115 provides a local graphical user interface for EMCU monitoring and control. The local graphical user interface may be accessible from the LAN 120 regardless of a state of connectivity to WAN 130. Computing devices 125 such as personal computers, tablet computers, notebook computers, mobile phones, smart televisions, etc. connected to the LAN 120 may log into the interface provided by the energy management module 115 on the second networking device 105. Once a computing device 125, 128 is logged into the energy management module 115, the local interface enables users to view real-time and historical consumption data, control appliances 160-170 and set schedules for these appliances 160-170. The local interface and web service of the server computing device 135 give energy consumers actionable energy consumption information bundled with the ability to take real-time action from anywhere at any time.

In one embodiment, the energy management module 115 provides a secure, always on connection between the EMCUs 145-155 and the server computing device 135 (so long as the second networking device 105 has a connection to WAN 130). Alternatively, the energy management module 115 may periodically connect to the server computing device 135 to upload energy consumption data.

The server computing device 135 provides an energy management service platform, which is a comprehensive suite of services and web-based applications with 24/7 availability. The service platform stores data and outputs it to a secure, web-based, graphic user interface that enables real-time and historical data review, remote control of EMCUs 145-155, and administration of accounts and services. Remote computing devices 128 connected to the WAN 130 may log into web based interface to gain access to and control the home energy management system 100. Accordingly, a user may log in to control all of his appliances from outside of his or her home.

The energy management service platform may include a communication platform, a repository system, an application programming interface (API), an end-user application and a customer application. The communication platform is middleware that securely manages the flow of data from deployed HEM Systems. The server computing device 135 may use SSL (e.g., Open SSL) to establish a secure connection to the energy management module 115 (and thus to the home energy management system 100). The communication platform's core functions are to maintain a secure, persistent connection with deployed energy management modules 115, acquire consumption and operational data from deployed energy management modules 115, perform maintenance tasks, such as updating firmware, notifying end-users of events they want to know about via chat, email or SMS, and relaying user-defined appliance control and scheduling instructions to deployed energy management modules 115.

The repository system stores energy consumption data retrieved from energy management modules 115 and makes this data available to applications through the API. The API is the programming environment in which parties can develop services for delivery to consumers over the energy management service platform. Applications will have the ability take advantage of anonymized energy consumption data obtained by EMCUs in the field. Developers may not retain this information, but they may be allowed to use it in applications they build.

The end-user application provides a front end interface that enables energy consumers to create and set up accounts, control appliances, set schedules for appliances, monitor real-time energy consumption (cumulative or by appliance), access historical consumption data (cumulative or by appliance), configure system settings, and modify account details and personal preferences. The customer application is a front end interface built primarily for use by utility companies, but it may be accessed by other customer types (i.e. telecommunications companies) that deploy the HEM System 100 to their customers. The customer application gives these organizations the means to access real-time and historical energy consumption data at a macro and micro level, export energy consumption data into tools of their choice so they may analyze data and better predict the future demand for energy, suggest behavioral changes that help their customers save energy, and perform other actions. For example, via the customer application, electric utilities may remotely run diagnostic tests and perform maintenance on deployed systems and push relevant data to deployed systems (i.e. changes in energy cost).

The home energy management system 100 described in embodiments above may offer 2 services—one for energy consumers and another for utility companies. The service for consumers provides real-time and historical energy consumption data by appliances or similar devices. It also gives consumers the ability to control appliances or similar devices and set schedules for them via a local interface or the Internet. When bundled with pricing information from their utility company, energy consumers can see how much energy they are using, in kilowatts and dollars, and instantly take the action that makes the most financial and environmental sense for them.

The service for utility companies provides detailed consumption data beyond the electric meter. Utilities may obtain information on how much energy each appliance within a home or office consumes and how frequently it is used. Information may be provided at a macro level, for an entire coverage area. Alternatively, the information can be broken down to the point where utilities can view consumption information from a single home or business. This enables the utility to quantify any similarities in energy usage patterns by city, neighborhood or street.

Traditional home energy management solutions contain a residential gateway device and consume more energy than they need to. Residential gateways and networking devices such as modems or routers consume roughly the same amount of energy—approximately 5 watts. Overall consumption by traditional home energy management solutions when these devices are used in parallel is approximately 10 watts. Use of the protocol conversion device 140 and energy management module 115 as described herein removes one energy consuming device (the residential gateway) from the equation and instantly cuts consumption costs in half. Additionally, by eliminating the residential gateway, the HEM System 100 described in embodiments herein eliminates the upfront purchase of a service enabling hardware device (the residential gateway). That, in turn, speeds up the time to positive return on investment for energy consumers by reducing an overall cost of the HEM System 100. Accordingly, embodiments both reduce an upfront cost and a total cost of ownership.

Figure 2:
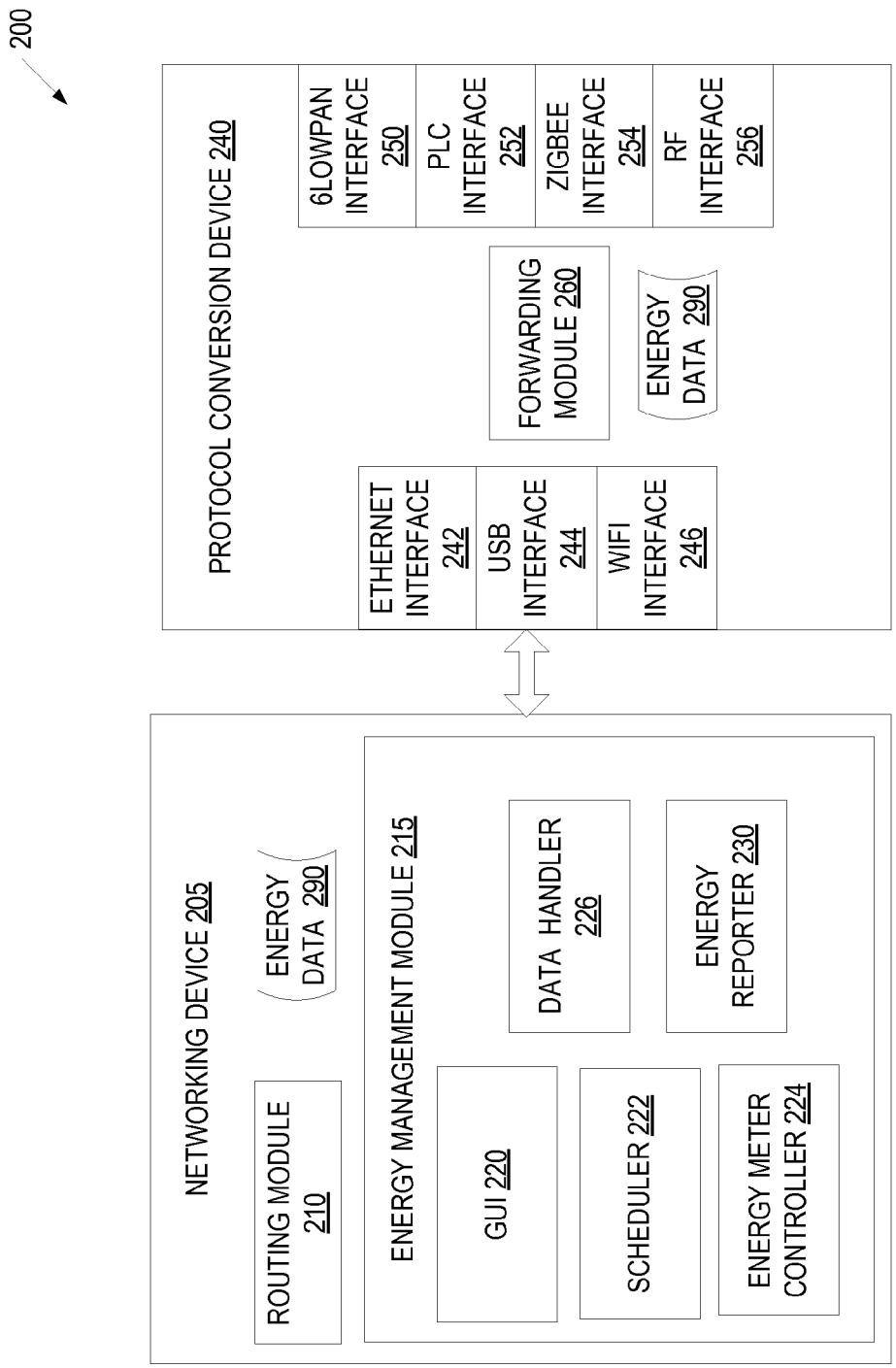
FIG. 2 is a block diagram illustrating two components of a home energy management system, in accordance with one implementation of the present invention.

FIG. 2 is a block diagram illustrating two components of a home energy management system, in accordance with one implementation of the present invention. Specifically, FIG. 2 illustrates a standard networking device 205 that has been modified to act as a residential gateway for a home energy management system. FIG. 2 further illustrates a protocol conversion device 240 connected to the networking device 205. The protocol conversion device 240 may act as an energy management bridge for the home energy management system.

The networking device 205 may be a standard networking device that performs the functions of one or more of a cable modem, a DSL modem, a DSL router, a wireless router, a network switch, a wireless access point, and so on. In one embodiment, the networking device 205 includes a routing module 210 that performs standard operations of the networking device 205 as well as an energy management module 215 that adds functionality of a residential gateway for a HEM System to the networking device 205.

The energy management module 215 may be software or firmware that has been added to a non-volatile memory of the networking device. Alternatively, or additionally, the energy management module 215 may include a hardware logic (e.g., a circuit chip) that is installed on the networking device. The energy management module 215 may be installed onto the networking device by an end user, by a service provider (e.g., by an internet service provider) or by a manufacturer of the networking device. In one embodiment, the protocol conversion device 240 installs the energy management module 215 on the networking device 205. Responsive to the protocol conversion device 240 being connected to the networking device 205, the protocol conversion device 240 may detect that the networking device 205 has sufficient memory to store the energy management module 215 The protocol conversion device 240 may then query a remote server and request that the remote server install the energy management module 215 on the networking device 205.

Alternatively, the protocol conversion device 205 may include one or more energy management module installation routines. When the protocol conversion device 240 is connected to a networking device, the protocol conversion device 240 may identify a chipset included in the networking device 205, and may select an installation routine appropriate to the identified chipset. The protocol conversion device 240 may then install a version of the energy management module 215 compatible with the identified chipset using the appropriate installation routine.

The combination of the protocol conversion device 240 and the energy management module 215 in the standard networking device 205 bridges the communication gap between EMCUs, which communicate over one set of communication protocols, and the Internet, which has its own set of communication processes and protocols. The energy management module 215 and protocol conversion device 240 together eliminate any need for a dedicated residential gateway hardware device, thereby reducing upfront hardware costs and overall energy consumption rate.

In one embodiment, the energy management module 215 includes a graphical user interface (GUI) 220, a scheduler 222, an energy meter controller 224, a data handler 226 and an energy reporter 230. The GUI 220 may enable end-user access to all components of the HEM System, including the energy management module 215, the protocol conversion device 240 and EMCUs. The GUI 220 additionally provides system monitoring, control and configuration capabilities locally to a user (without the need for an Internet connection) and remotely (over the Internet).

Energy meter controller 224 issues commands to EMCUs. The commands may include on, off and standby commands. The commands may also include power level state commands, increment power commands and decrement power commands. The commands may be issued responsive to user interaction with the GUI. Alternatively, the commands may be issued responsive to instructions received from a remote server (e.g., from a remote server that provides a web interface for the energy management modules 215). The commands may also be generated automatically by the scheduler 222 according to a configured schedule.

Scheduler 222 automates power control of EMCUs and the appliances or similar devices connected to the EMCUs. Scheduler 222 may include a separate schedule for each EMCU and/or each appliance, or any combination thereof. The schedules may be set by a user via the GUI 220 and/or may be automatically set from instructions from a remote server or based on energy usage statistics. For example, appliances that consume large amounts of energy may automatically be scheduled to power off during peak energy usage hours (when the cost of energy may be at its highest). Each schedule may identify when to power on an appliance, when to power off an appliance, and so on.

Energy reporter 230 may generate statistics from received energy data 290. For example, energy reporter 230 may determine average daily, weekly, monthly, yearly, etc. energy usage for each appliance, generate energy usage graphs showing when appliances are used, and so on. Energy reporter 230 may also receive energy cost data from a remote server, and may use the cost data and energy data 290 to compute the average daily, weekly, monthly, yearly, etc. energy cost of each appliance. Energy reporter 230 may also receive energy usage statistics from a remote server. The remote server may receive the energy data 290 from data handler 225, compute the energy usage statistics, and provide the energy usage statistics to energy reporter 230.

Energy management module 215 receives data packets containing energy consumption data 290 from protocol conversion device 240. Data handler 226 may then cache the energy data 290 locally until the data is successfully uploaded to a remote data center via the internet, deleted by an end-user manually, or deleted by the system to make room for new data. The amount of data which can be stored locally may be dependent on storage capacity of the networking device. For example, cable modems and DSL routers may have minimal storage capacity. Accordingly, if the networking device 205 is a cable modem or a DSL router, then data handler 226 may store minimal or no energy data 290 on the networking device 205. In contrast, wireless routers typically have enough storage capacity to store up to a month of energy data 290.

In one embodiment, data handler 226 caches data on multiple different devices. For example, data handler 226 may cause protocol conversion device 240 to store energy data 290, and may cause EMCUs to store energy data. In one embodiment, the EMCUs, protocol conversion device 240 and networking device 205 maintain redundant copies of energy data. For example, The EMCUs may store the last 30 minutes of energy data, the protocol conversion device may store the last hour of energy data, and the networking device may store the last four hours of energy data. Alternatively, the EMCUs, protocol conversion device 240 and networking device 205 cache different energy data. For example, the EMCUs may store the last 30 minutes of energy data, the protocol conversion device may store the previous 4 hours of energy data (e.g., from 30 minutes in the past to 4.5 hours in the past), and the networking device 205 may store the previous 8 hours of energy data (e.g., from 4.5 hours in the past to 12.5 hours in the past).

Data handler 226 may receive data packets that contain the energy data 290, and may modify or otherwise process the data packets. Data handler 226 may decrypt the data packets, extract payloads from the data packets, aggregate the payloads to generate new household power consumption messages, and so on. Data handler 226 may then transmit the household power consumption messages to a remote server.

In one embodiment, the energy management module 115 provides an application programming interface (API) that enables third parties to develop new services for delivery over the HEM System. This gives third parties the ability to offer new products and services to a targeted audience (electric companies and energy conscious consumers).

Protocol conversion device 240 connects to networking device 205 via a TCP/IP protocol connection, such as an Ethernet connection or a WiFi connection. Protocol conversion device 240 includes multiple communication interfaces, such as an Ethernet interface 242, a universal serial bus (USB) interface 244, a WiFi interface 246, a 6LowPAN interface 250, a PLC interface 252, a Zigbee interface 254 and a generic RF interface 256.

Protocol conversion device 240 additionally includes a forwarding module 260 that receives data packets on an incoming communication interface and transmits the data packets on an outgoing communication interface. In one embodiment, the protocol conversion device 240 does not attempt to interpret the payload of data packets being routed through it. This allows the protocol conversion device 240 to handle different schemas of data encryption and different protocols during the data exchange process.

All data exchanged through the protocol conversion device may have a common, unencrypted header that contains routing information, and may additionally include a payload. The payload may be encrypted on unencrypted. The header of a received data packet may have a fixed size and contain information such as a source protocol identifier (ID), a source global unique identifier (GUID), a destination protocol ID, and a destination GUID. The protocol ID is a unique number that identifies the communication protocols involved in each specific data packet. In one example, 01='Ethernet', 02='powerline', 03='Zigbee', and so on. The source protocol ID identifies the protocol used by the source device and the destination protocol ID identifies the protocol used by the destination device. The GUID is a unique number used to identify every device in the network. The source GUID identifies the source device for a data packet and the destination GUID identifies the destination device for the data packet.

Forwarding module 260 may analyze a received data packet to identify a destination GUID and a destination protocol ID. The forwarding module 260 may then forward the data packet to the destination device having the destination GUID using a protocol having the destination protocol ID. For example, protocol conversion device 240 may receive a data packet from networking device 205 via Ethernet interface 242 that is addressed to a particular EMCU.

Forwarding module 260 may identify the particular EMCU in the header and determine that the EMCU supports a PLC protocol. Accordingly, forwarding module 260 may transmit the data packet to the particular EMCU using the PLC interface 252. The protocol conversion module 240 may also support additional routing methods such as wide broadcast routing and narrow broadcast routing. "Broadcasting" in this instance, refers to transmitting data packets that are received by every device in a network. The protocol conversion device 240 can, when connected to networking device 205 through an Ethernet port, carry out additional tasks such as relaying data for communication with a server computing device, forwarding of security certificates, implementation of system configuration data, verification of system identification and more.

In one embodiment, the payload of data packets are encrypted at the two endpoints (source and destination), which recognize the encryption method and how to decode the message. The endpoints may be, for example, the networking device 205 and EMCUs. In one embodiment, data handler 226 encrypts data packets that are to be sent to other devices such as EMCUs, protocol conversion device 240 or a remote server. Data handler 226 may additionally decrypt data packets received from such other devices. Standard symmetric and/or asymmetric encryption techniques using shared keys or public key pairs may be used to encrypt and decrypt messages. For example, the networking device, server and EMCUs may each have digital certificates associated with a unique public key pair. The EMCUs may include a public key of the networking device, and the networking device 205 may include public keys of the EMCUs. Therefore, the EMCUs may encrypt data using their private keys, and the networking device may decrypt the data using a stored copy of the EMCU's public keys. In one embodiment, the protocol conversion device 240 forwards encrypted data packets without reading or decrypting a payload of the data packets.

Figure 3:
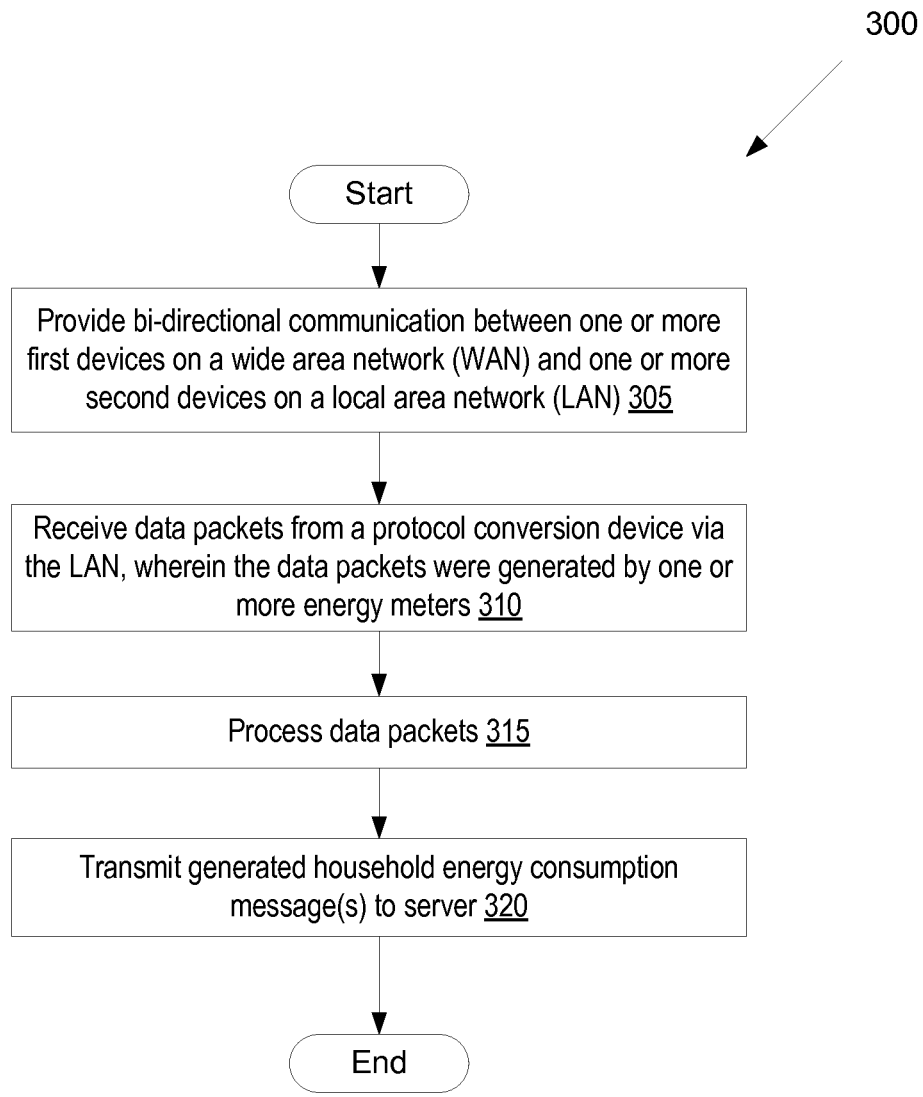
FIG. 3 is a flow diagram illustrating one embodiment of a method for processing energy usage data by a networking device configured to be a component of a home energy management system.
Figure 4:
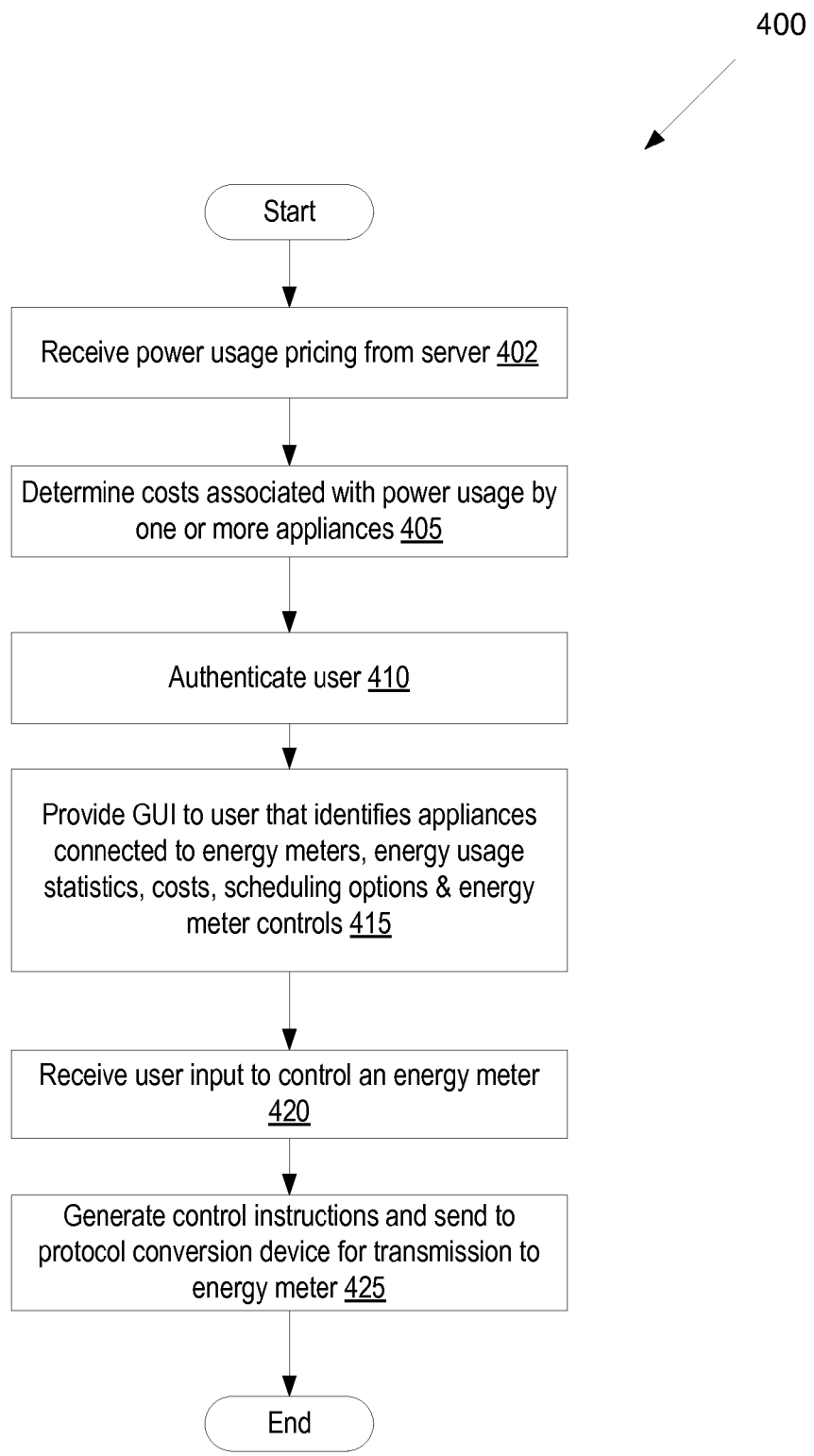
FIG. 4 is a flow diagram illustrating one embodiment of a method for controlling a home energy management system.
Figure 5:
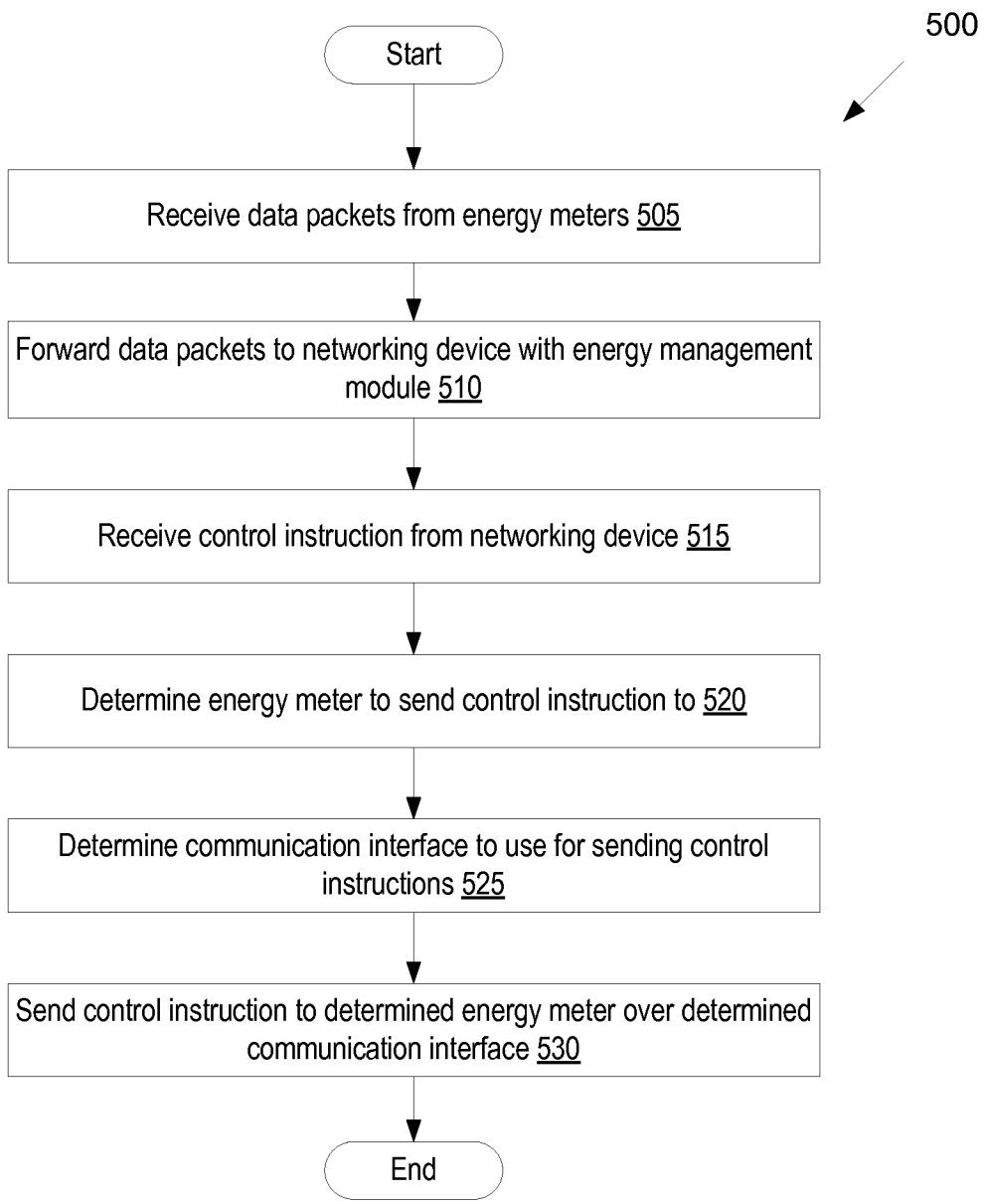
FIG. 5 is a flow diagram illustrating one embodiment of a method for connecting energy meters to a networking device.

FIGS. 3-5 are flow diagrams showing various methods for providing and controlling a home energy management system. The methods may be performed by one or more components of an energy management system, such as a networking device configured to function as an energy management gateway and a protocol conversion device that acts as an energy management bridge. The devices that perform the methods may comprise hardware (e.g., circuitry, dedicated logic, programmable logic, microcode, etc.), software (e.g., instructions run on a processing device to perform hardware simulation), firmware, or a combination thereof. In one embodiment, at least some operations of the methods are performed by energy management module 115 and at least some operations of the methods are performed by protocol conversion device 140 of FIG. 1.

FIG. 3 is a flow diagram illustrating one embodiment of a method 300 for processing energy usage data by a networking device configured to be a component of a home energy management system. At block 305 of method 300, processing logic provides bi-directional communication between one or more first devices on a wide area network (WAN) and one or more second device on a local area network (LAN). At block 310, processing logic receives data packets from a protocol conversion device via the LAN. The data packets may have been generated by one or more energy meters (e.g., by EMCUs). The received data packets contain energy consumption data associated with one or more appliances or similar devices connected to the energy meters.

At block 315, processing logic processes the data packets. This may include decrypting the data packets, extracting payloads from the data packets, and so on. Processing logic may additionally generate household energy consumption messages. At block 320, processing logic transmits the generated household energy consumption messages to a server. The server may then compute energy consumption statistics from the energy consumption data and provide the energy consumption statistics to, for example, a networking device that includes an energy management module.

FIG. 4 is a flow diagram illustrating one embodiment of a method 400 for controlling a home energy management system. At block 402 of method 400, processing logic receives power usage pricing from a server. At block 405, processing logic determines costs associated with power usage by one or more appliances connected to energy meters in a HEM System.

At block 410, processing logic receives a login request and authenticates a user based on user provided credentials. At block 415, processing logic provides a graphical user interface to the user that identifies appliances connected to the energy meters, energy usage statistics, costs associated with power consumption of the appliances, scheduling options and energy meter controls. At block 420, processing logic receives a user input to control an energy meter. At block 425, processing logic generates control instructions and sends the control instructions to a protocol conversion device as a payload in a data packet. The data packet may be sent to the protocol conversion device via a TCP/IP connection. The protocol conversion device then forwards the data packet to the energy meter via a second connection that uses a different protocol, such as a Zigbee or PLC protocol. The energy meter may then execute the instructions, which may cause the energy meter to turn an appliance on, turn an appliance off, and so on.

FIG. 5 is a flow diagram illustrating one embodiment of a method 500 for connecting energy meters to a networking device. At block 505 of method 500, processing logic of a protocol conversion device receives data packets from one or more energy meters (e.g., from EMCUs). At block 510, processing logic forwards the data packets to a networking device that includes an energy management module. At block 515, processing logic receives control instructions from the networking device. The control instructions may be received as a data packet. The data packet may include a header identifying a source device, a destination device, a source protocol and a destination protocol. At block 520, processing logic examines the header to determine a particular energy meter to transmit the control instruction to. At block 525, processing logic determines from the header a protocol (and thus communication interface) to use for sending the control instruction to the particular energy meter. At block 530, processing logic sends the control instruction to the determined energy meter using the determined communication interface and protocol.

Figure 6A:
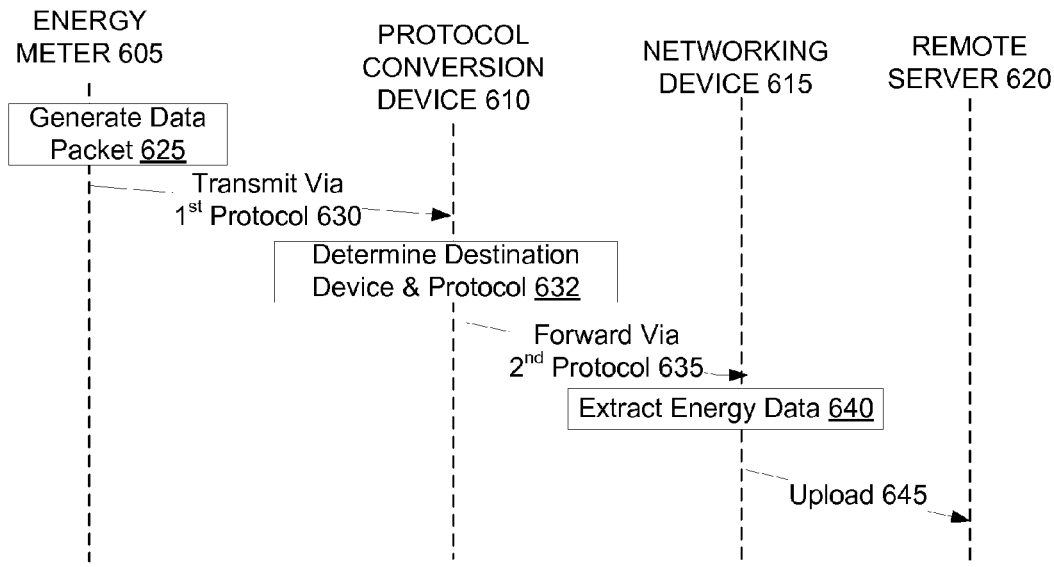
FIG. 6A illustrates a sequence diagram showing one embodiment of collecting and reporting energy usage data by an energy management system.
Figure 6B:
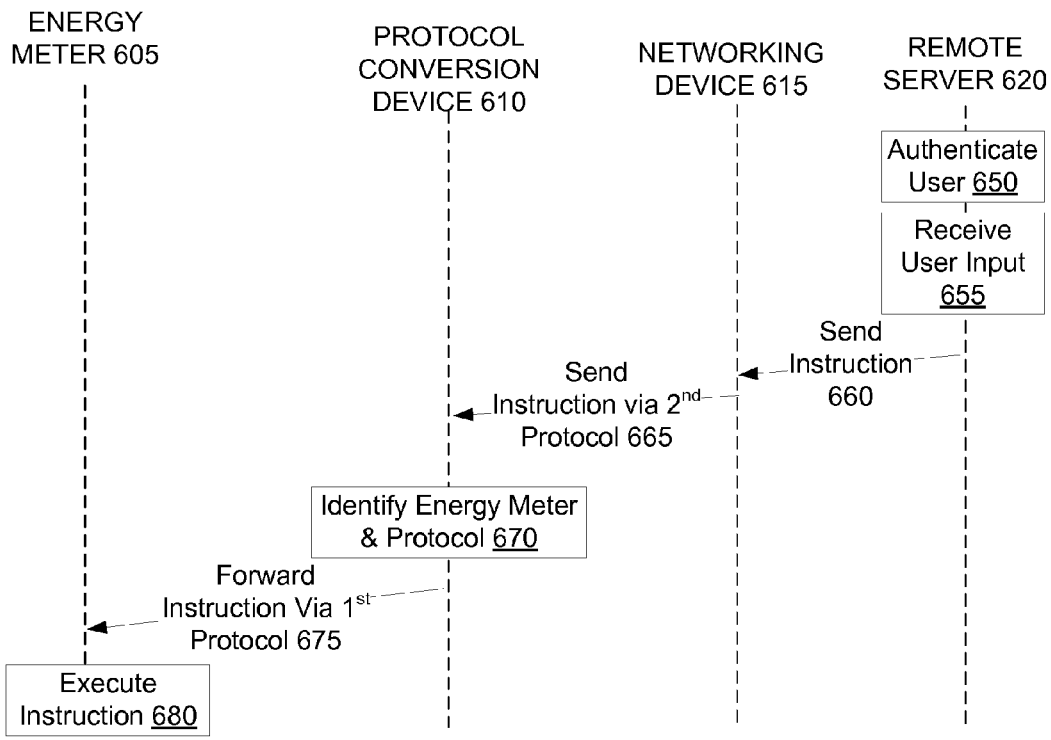
FIG. 6B illustrates a sequence diagram showing one embodiment of controlling an energy management system.

FIG. 6A illustrates a sequence diagram showing one embodiment of collecting and reporting energy usage data by an energy management system. FIG. 6B illustrates a sequence diagram showing one embodiment of controlling an energy management system. The energy management system includes an energy meter 605 (e.g., an EMCU), a protocol conversion device 610 (e.g., an energy management bridge), a networking device 615 (configured to operate as a residential gateway) and a remote server 620.

In FIG. 6A, the energy meter 605 generates a data packet at block 625. The generated data packet may include an unencrypted header identifying the energy meter 605 as a source device and the networking device 615 as a destination device. The header may also identify a first protocol associated with the energy meter 605 and a second protocol associated with the networking device. The generated data packet may also include an encrypted payload that includes energy consumption data of an appliance monitored by the energy meter 605. The energy meter 605 transmits the data packet via the first protocol 630 to the protocol conversion device 610.

At block 632, the protocol conversion device 610 determines that the data packet is addressed to the networking device 615 and a second protocol associated with the destination device. The protocol conversion device 610 then forwards 635 the data packet to the networking device 615 using the identified second protocol.

At block 640, the networking device 615 extracts the energy data from the data packet. This may include decrypting the payload of the data packet. The networking device 615 then uploads 645 the energy data to the remote server 620.

In FIG. 6B, the remote server 620 authenticates a user at block 650. The remote server then receives user input at block

655. The user input may be an input to control energy meter 605. The remote server 620 sends a control instruction 660 to the networking device 615. The networking device 615 may then send the control instruction 665 to the protocol conversion device 610 via the second protocol. Alternatively, the networking device 615 may generate a new instruction responsive to receiving the instruction from the remote server 620, and send the new instruction to the protocol conversion device 610. Note that in an alternative embodiment, the networking device 615 may authenticate the user and receive the user input, and may not receive any instructions from the remote server 620. Instead, the networking device 615 may generate the instruction based on the user input and send it to the protocol conversion device 610.

The instruction sent to the protocol conversion device 610 may be a payload of a data packet. The data packet may include an unencrypted header identifying the networking device 615 as a source device and energy meter 605 as a destination device. The header may also identify a first protocol associated with the energy meter 605 and a second protocol associated with the networking device 615.

At block 670, the protocol conversion device 610 identifies that the data packet is addressed to the energy meter 605 and a first protocol associated with the energy meter 605. The protocol conversion device 610 then forwards 675 the data packet to the energy meter 605 using the identified first protocol. At block 680, the energy meter 605 executes the instruction 680. In one embodiment, the energy meter 605 decrypts the payload of the data packet prior to executing the instruction.

Figure 7:
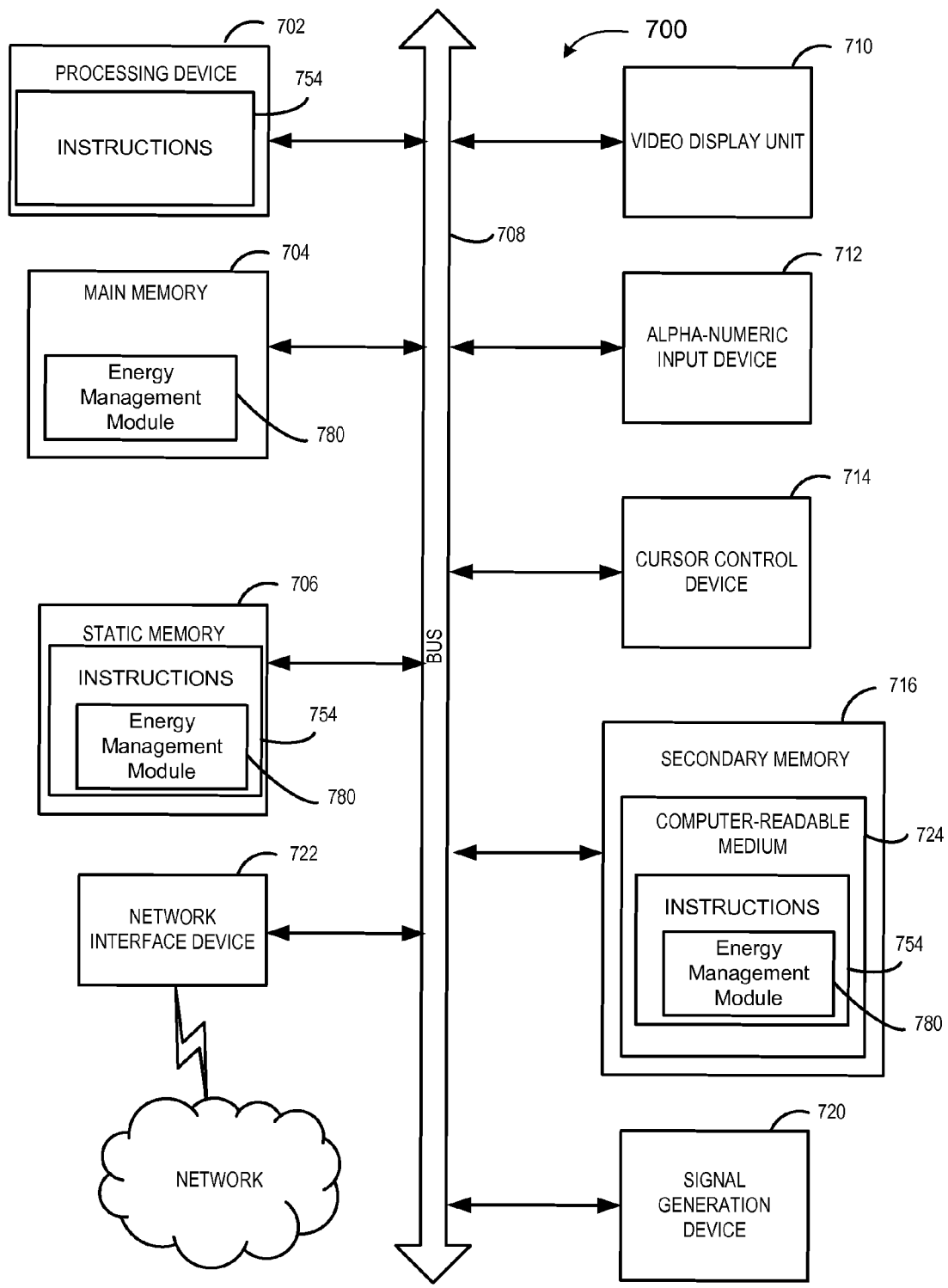
FIG. 7 illustrates a block diagram of one embodiment of a computing device.

FIG. 7 illustrates an example of a computing device, in accordance with implementations described herein. The computing device 700 may correspond to a first networking device 102, a second networking device 105, a computing device 125, 128, a server computing device 135, an EMCU 145, 150, 155 or a protocol conversion device 140 of FIG. 1. In embodiments of the present invention, the machine may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "computing device" shall also be taken to include any collection of machines (e.g., computers) that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 716 (e.g., a data storage device), which communicate with each other via a bus 708. In some embodiments, the computing device 700 may lack one of more of these components, such as the secondary memory 716.

The processing device 702 represents one or more general-purpose processors such as a microprocessor, central processing unit, or the like. The processing device 702 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 702 may also be one or more special-purpose processing devices such as an application specific integrated circuit (ASIC), a field programmable gate array (FPGA), a digital signal processor (DSP), network processor, or the like.

The computing device 700 may further include a network interface device 722, or multiple different network interface devices (e.g., that support different communication protocols). The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker) in some embodiments.

The secondary memory 716 may include a machine-readable storage medium (or more specifically a computer-readable storage medium) 724 on which is stored one or more sets of instructions 754 such as instructions for an energy management module 780. The static memory 706 may additionally or alternatively include embedded instructions embodying any one or more of the methodologies or functions described herein (e.g., for energy management module 780). The instructions 754 may also reside, completely or at least partially, within the main memory 704 and/or within the processing device 702 during execution thereof by the computer system 700; the main memory 704 and the processing device 702 also constituting machine-readable storage media.

While the computer-readable storage medium 724 is shown in an example embodiment to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The modules, components and other features described herein (for example in relation to FIGS. 1-2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "assigning", "modifying", "transmitting", "querying", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A home energy management system comprising:
   a protocol conversion device configured to:
     provide bi-directional communication between a networking device and one or more energy meters, wherein the protocol conversion device connects to the networking device via a transmission control protocol/Internet protocol (TCP/IP) connection and connects to the one or more energy meters via one or more communication protocols supported by the one or more energy meters;
     receive a data packet from a first energy meter;
     identify a protocol ID associated with the data packet that identifies a first communication protocol for the data packet that is supported by the first energy meter;
     convert the data packet, based on the protocol ID, from the first communication protocol to a second communication protocol for transmission over the TCP/IP connection; and
   the networking device, connected to the protocol conversion device via the TCP/IP connection, configured to:
     receive, from the protocol conversion device, the data packet; and
     transmit the data packet to a remote server.

2. The home energy management system of claim 1, wherein the networking device is at least one of a cable modem, a digital subscriber line (DSL) modem, a DSL router, a network switch, a WiFi router or a wireless access point, and wherein the networking device comprises an energy management module configured to receive the data packet, generate one or more messages containing a payload of the data packet and transmit the one or more messages.

3. The home energy management system of claim 1, wherein the one or more energy meters store one or more first sets of data packets and the protocol conversion device stores a second set of the data packets.

4. The home energy management system of claim 1, wherein the networking device is further configured to:
   send control instructions to the protocol conversion device for transmission to the one or more energy meters, wherein the control instructions cause the one or more energy meters to power on or power off one or more appliances coupled to the one or more energy meters.

5. The home energy management system of claim 4, wherein the networking device is further configured to:
   output a graphical user interface to a computing device on a local area network, wherein the graphical user interface identifies the one or more appliances, provides energy usage statistics and enables a user of the computing device to issue the control instructions.

6. The home energy management system of claim 5, wherein the networking device is further configured to:
   receive power usage pricing data from the remote server;
   determine costs associated with power usage of the one or more appliances; and
   output the costs via the graphical user interface.

7. The home energy management system of claim 1, wherein the networking device is further configured to:
   receive data packets on a periodic basis;
   aggregate payloads of a plurality of data packets into a data packet message; and
   send the data packet message to the remote server.

8. The home energy management system of claim 1, wherein the protocol conversion device connects to the one or more energy meters using at least one of a power line communication (PLC) protocol, a Zigbee protocol, an IPv6 over low power wireless personal area networks (6LoWPAN) protocol, or a radio frequency (RF) protocol.

9. A networking device comprising:
   a memory; and
   a processing device, coupled to the memory, configured to:
     provide bi-directional communication between one or more first devices on a wide area network (WAN) and one or more second devices on a local area network (LAN);
     receive a data packet from a protocol conversion device of the one or more second devices via the LAN, wherein the data packet comprises energy usage data generated by one or more energy meters connected to the protocol conversion device via a first communication protocol unsupported by the networking device, wherein the data packet was converted by the protocol conversion device, based on a protocol ID, from the first communication protocol to a second communication protocol that is supported by the networking device for transmission over the WAN; and transmit payloads of data packets to a server computing device of the one or more first devices, wherein the server computing device generates usage statistics based on the payloads.

10. The networking device of claim 9, wherein the networking device is at least one of a cable modem, a digital subscriber line (DSL) modem, a DSL router, a network switch, a WiFi router or a wireless access point, and wherein the networking device comprises an energy management module configured to receive the data packets, generate a message from the payloads of the data packets, and transmit the message.

11. The networking device of claim 9, wherein the processing device is further configured to:
send control instructions to the protocol conversion device for transmission to the one or more energy meters, wherein the control instructions cause the one or more energy meters to power on or power off one or more appliances coupled to the one or more energy meters.

12. The networking device of claim 11, wherein the processing device is further configured to:
output a graphical user interface to a computing device of the one or more second devices, wherein the graphical user interface identifies the one or more appliances, provides energy usage statistics and enables a user of the computing device to issue the control instructions.

13. The networking device of claim 12, wherein the processing device is further configured to:
receive power usage pricing data from a remote server;
determine costs associated with power usage of the one or more appliances; and
provide the costs via the graphical user interface.

14. The networking device of claim 9, wherein the processing device is further configured to:
receive the data packets on a periodic basis;
aggregate the payloads of the data packets into one or more household energy consumption messages; and
send the one or more household energy consumption messages a remote server.

15. A non-transitory computer readable storage medium having instructions that, when executed by a processing device of a network device, cause the processing device to perform operations comprising:
providing bi-directional communication between one or more first devices on a wide area network (WAN) and one or more second devices on a local area network (LAN);
receiving a data packet from a protocol conversion device of the one or more second devices via the LAN, wherein the data packet comprises energy usage data generated by one or more energy meters connected to the protocol conversion device via a first communication protocol unsupported by the networking device, wherein the data packet was converted by the protocol conversion device, based on a protocol ID, from the first communication protocol to a second communication protocol that is supported by the networking device for transmission over the WAN; and
transmitting payloads of data packets to a server computing device of the one or more first devices, wherein the server computing device generates usage statistics based on the payloads.

16. The non-transitory computer readable storage medium of claim 15, wherein the networking device is at least one of a cable modem, a digital subscriber line (DSL) modem, a DSL router, a network switch, a WiFi router or a wireless access point, and wherein the networking device comprises an energy management module configured to receive the data packets, generate a message comprising the payloads and transmit the message.

17. The non-transitory computer readable storage medium 15, wherein the operations further comprise:
sending control instructions to the protocol conversion device for transmission to the one or more energy meters, wherein the control instructions cause the one or more energy meters to power on or power off one or more appliances coupled to the one or more energy meters.

18. The non-transitory computer readable storage medium 17, wherein the operations further comprise:
outputting a graphical user interface to a computing device on the local area network, wherein the graphical user interface identifies the one or more appliances, provides energy usage statistics and enables a user of the computing device to issue the control instructions.

19. The non-transitory computer readable storage medium 18, wherein the operations further comprise:
receiving power usage pricing data from the remote server;
determining costs associated with power usage of the one or more appliances; and
providing the costs via the graphical user interface.

20. The non-transitory computer readable storage medium 15, wherein the operations further comprise:
receiving the data packets on a periodic basis;
aggregating the data packets into a household energy consumption message; and
sending the household energy consumption message to the remote server.

21. A protocol conversion device, comprising:
a first network communication interface configured to connect, via a transmission control protocol/internet protocol (TCP/IP) connection, to a networking device having an energy management module;
a second network communication interface configured to connect to one or more energy meters via one or more additional connections comprising one or more protocols not supported by the networking device; and
a processing device configured to:
receive data packets from the one or more energy meters via the one or more additional connections;
identify a protocol ID associated with a first data packet that identifies a first communication protocol for the first data packet that is not supported by the networking device;
convert the first data packet, based on the protocol ID, from the first communication protocol to a second communication protocol that is supported by the networking device; and
transmit the data packets to the networking device via the TCP/IP connection, wherein the networking device is configured to generate a household energy consumption message comprising aggregated payloads of the data packets and sends the household energy consumption message to a remote server.

* * * * *